(12) United States Patent
Chiba et al.

(10) Patent No.: US 6,665,088 B1
(45) Date of Patent: Dec. 16, 2003

(54) PAGE PRINTER AND PAGE PRINT SYSTEM

(75) Inventors: Noriyoshi Chiba, Nagano (JP); Tetsuya Suzuki, Nagano (JP); Kazuyuki Onuma, Nagano (JP); Michio Maruyama, Nagano (JP); Sunao Murata, Nagano (JP); Hiroyasu Ogata, Nagano (JP); Kazunori Chihara, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/407,970

(22) Filed: Sep. 29, 1999

(30) Foreign Application Priority Data

Sep. 29, 1998 (JP) .......................................... P10-275074
May 5, 1999 (JP) .......................................... P11-097997

(51) Int. Cl.$^7$ .............................................. G06F 15/00
(52) U.S. Cl. ..................... 358/1.17; 358/1.16; 358/1.15; 358/1.2
(58) Field of Search ............................... 358/1.17, 1.16, 358/1.2, 1.15, 1.14; 345/530

(56) References Cited

U.S. PATENT DOCUMENTS

| | | | | |
|---|---|---|---|---|
| 5,604,847 A | * | 2/1997 | Dennis et al. | 358/1.17 |
| 6,188,422 B1 | * | 2/2001 | Ogura | 347/171 |
| 6,304,335 B1 | * | 10/2001 | Furuya et al. | 358/1.15 |
| 6,369,910 B1 | * | 4/2002 | Mitani | 358/1.17 |
| 6,388,760 B2 | * | 5/2002 | Kadota et al. | 358/1.14 |

FOREIGN PATENT DOCUMENTS

| | | | |
|---|---|---|---|
| JP | 03-175066 A | 7/1991 | |
| JP | 6-305203 | 11/1994 | .............. B41J/5/30 |
| JP | 07290771 | 11/1995 | .............. B41J/5/30 |
| JP | 08-129463 A | 5/1996 | |
| JP | 2663861 | 6/1997 | .............. B41J/5/30 |
| JP | 9-314930 | 12/1997 | .............. B41J/5/30 |
| JP | 10-97391 | 4/1998 | .............. G06F/3/12 |
| JP | 10-129050 | 5/1998 | .............. B41J/5/30 |
| JP | 10-133831 A | 5/1998 | |
| JP | 10-207649 A | 8/1998 | |
| JP | 10-233877 A | 9/1998 | |
| JP | 10-285363 A | 10/1998 | |

* cited by examiner

Primary Examiner—Edward Coles
Assistant Examiner—Twyler Lamb
(74) Attorney, Agent, or Firm—Sughrue Mion, PLLC

(57) ABSTRACT

A host sends each page of image data to a page printer in band units and the page printer writes the received each band data into a reception buffer in DRAM by DMA and transfers the band data from the reception buffer to an image formation section made up of members. The host gets an available buffer capacity from the printer just before transmitting each band data, and transmits the band data only when the printer can receive the band data. In the printer, a CPU permits transfer DMA to be started after reception data as much as the data amount calculated based on the data reception speed and the transfer rate is stored in the buffer to prevent an underrun error from occurring. If an underrun error occurs, the CPU sets an error flag, and sends the error flag to the host just before the host starts transmitting each band data. When receiving the error flag, the host drops image resolution and resends the page data with the resolution dropped.

23 Claims, 12 Drawing Sheets

PAGE PRINTER AND PAGE PRINT SYSTEM

BACKGROUND OF THE INVENTION

1. Field of the Invention

This invention relates to a page printer used with a computer system, etc., and in particular to control of the operation of storing image data in buffer memory, reading the image data from the buffer memory, and transferring the image data to a print engine.

The present application is based on Japanese Patent Applications No. Hei. 10-275074 and No. Hei. 11-97997, which are incorporated herein by reference.

2. Description of the Related Art

In a page printer, it is a general rule that the speed at which image data is expanded into a bit map and written into buffer memory differs from the speed at which image data is read from the buffer memory and is transferred to a print engine. Often, buffer memory has a small capacity and cannot store one page of image data. Thus, particularly for a complicated image of a large amount of data, image data expansion and write into the buffer memory is too late for the transfer timing to the print engine and an error in which data to be read from the buffer memory runs out during printing the page and the printing cannot be continued may occur (the error is referred to as an underrun error in the specification). In contrast, image data expansion and write into the buffer memory is too fast and the buffer memory becomes full, then an error in which the subsequent data cannot be written may occur (the error is referred to as an overrun error in the specification).

To solve this problem, in a page printer in Japanese Patent No. 2663861, a match between the buffer memory write address and read address is detected, whereby error occurrence is detected and the host is informed of the error occurrence, then informs the user of the error occurrence so that the user can take proper steps.

However, the advantage of the related art described above is only to inform the user of error occurrence when an error occurs for taking proper steps. For the user, it is ideal that no error occurs and print always succeeds. It is more desirable that if an error occurs, the system automatically takes proper steps for handling the error.

SUMMARY OF THE INVENTION

It is an object of the invention to prevent an overrun error from occurring.

It is another object of the invention to prevent an underrun error from occurring.

It is still another object of the invention to automatically take proper steps and retry printing, thereby causing the retried printing to succeed if an underrun error occurs.

According to a first aspect of the invention, there is provided a page printer comprising memory containing a buffer, an image output section for forming an image based on data and outputting the image, a reception section for writing data received from a host into the buffer, a transfer section for transferring the data in the buffer to the image output section, and a control section for controlling the reception section and the transfer section. The control section permits the transfer section to transfer the data in the buffer after at least a part as much as a predetermined amount P, of one page of data from the host is stored in the buffer. The predetermined amount P is equal to or less than the size of the buffer and is set so that the predicted point in time at which the transfer section will complete transferring of all of one page of data from the buffer becomes later than the predicted point in time at which the reception section will complete writing of all of the page of data into the buffer.

According to the page printer, the transfer start timing is controlled so that write of received data into the buffer always precedes transfer of the data from the buffer in the process of reception and transfer of one page of data, thus an underrun error is prevented.

Preferably, just before reception of each page is started, the predetermined amount P is determined so as to substantially satisfy the relation $$M \geq P > T(\alpha - (x/y))$$

where x is predicted data reception speed from the host, y is predicted data transfer speed to the image output section, α is a predicted compression rate of data from the host, T is the total number of data pieces of one page, and M is the buffer size.

Preferably, the predetermined amount P is determined by the printer itself. Preferably, the host determines the predetermined amount P and specifies the amount for the printer. When the host determines the predetermined amount P, the predetermined amount P is easy to set appropriately because generally the CPU of the host is high performance.

Preferably, if the buffer has an available capacity reduced to a predetermined minimum amount even before data as much as the predetermined amount P is stored in the buffer, the printer spontaneously starts transferring the data in the buffer, whereby if the predetermined amount P is not appropriate, an event in which the buffer becomes full is avoided.

According to a second aspect of the invention, there is provided a page printer comprising memory containing a buffer, an image output section for forming an image based on data and outputting the image, a reception section for writing data received from a host into the buffer, a transfer section for transferring the data in the buffer to the image output section, and a control section for controlling the reception section and the transfer section. The control section permits the transfer section to transfer the data in the buffer at a predetermined start timing. The start timing is set variably in response to a parameter affecting an increase or decrease in the data in the buffer. For example, the parameters affecting an increase or decrease in the data in the buffer are predicted data reception speed from the host, predicted data transfer speed to the image output section, a predicted compression rate of data from the host, the total number of data pieces of one page, the buffer size, etc. The start timing can be set in response to at least one of the parameters. Alternatively, the start timing can be set in response to different information substantially corresponding to the predicted data reception speed from the host, for example, the communication port, communication mode, etc., used with communication between the host and the printer.

According to the page printer, appropriate start timing such that no underrun error occurs and that the buffer does not become full, for example, for each page can be set, for example, for each page.

Preferably, the start timing is applied when at least a part as much as a predetermined amount P, of one page of data from the host is stored in the buffer, and the predetermined amount P is set so as to substantially satisfy $$M \geq P > T(\alpha - (x/y))$$

where x is predicted data reception speed from the host, y is predicted data transfer speed to the image output section, $\alpha$ is a predicted compression rate of data from the host, T is the total number of data pieces of one page, and M is the buffer size.

According to a third aspect of the invention, there is provided a page printer comprising memory containing a buffer; an image output section for forming an image based on data and outputting the image, a reception section for writing data received from a host into the buffer, a transfer section for transferring the data in the buffer to the image output section, an error detection section for detecting an underrun error caused by the fact that a read address of the transfer section from the buffer catches up with a write address of the reception section into the buffer, and an error notification section for notifying the host of occurrence of the underrun error. When the host is notified of underrun error occurrence from the page printer, it resends the data to the page printer under a condition where the underrun error is harder to occur.

When the underrun error occurs, the data is automatically resent under a condition where the underrun error is harder to occur (the process is repeated stepwise depending on the situation), whereby retry printing can be made to succeed as the data is resent without causing an underrun error to occur. Although the print image quality is somewhat degraded by dropping the resolution, print can be reliably made to succeed without troubling the user.

The condition where the underrun error is harder to occur is, for example, to delay the current transfer start timing of the data in the buffer by the transfer section or to make the current data resolution lower. Preferably, when an underrun error occurs, first the transfer start timing of the data in the buffer by the transfer section is set to a later timing and the data is resent. If an underrun error occurs still after the start timing is delayed, then the resolution is lowered and the data with the resolution lowered is resent.

Preferably, when detecting an underrun error, the printer temporarily stores occurrence information of the underrun error in the memory without immediately notifying the host of the underrun error. Upon reception of a request from the host, the printer transmits the underrun error occurrence information to the host. The host requests the printer to send error information at printer's convenience, for example, each time the host attempts to transmit one-band data. This method enables host processing to be simplified as compared with the method wherein the host is informed of an underrun error immediately when the underrun error is detected.

According to a fourth aspect of the invention, there is provided a page printer comprising memory containing a buffer, an image output section for forming an image based on data and outputting the image, a reception section for writing data received from a host into the buffer, a transfer section for transferring the data in the buffer to the image output section, and an available buffer capacity notification section for notifying the host of information concerning the available capacity of the buffer. The host transmits data of a size that can be received at the printer to the printer based on the notification from the page printer, whereby an overrun error is prevented.

Preferably, the host sends data compressed in predetermined units, for example, band units or data not compressed to the printer and gets the available buffer capacity from the printer just before transmission of each band data is started. If the available buffer capacity is equal to or larger than the size of the band data, the host starts transmitting the band data; if the available buffer capacity is less than the size of the band data, the host waits until the available buffer capacity becomes equal to or larger than the size of the band data before the host starts transmitting the band data.

Preferably, the page printer further has a function of detecting a printer error such as an underrun error and various types of printer status such as print success of each page. In this case, the printer once stores information of the detection result in the memory and transmits the information in the memory upon reception of a request from the host. Just before the host attempts to start transmitting each band data, it sends a request to the printer for getting the printer status.

According to a fifth aspect of the invention, there is provided a page printer comprising memory containing a buffer, an image output section for forming an image based on data and outputting the image, a reception DMA section for receiving data in a reception data size unit from a host and writing the data into the buffer by DMA, a transfer DMA section for transferring the data in the buffer to the image output section in a transfer data unit by DMA, and a control section for controlling the reception DMA section and the transfer DMA section. Here, the reception data size unit is the same as the transfer data size unit, for example, one band. The control section checks whether or not an underrun error occurs based on the transfer DMA start address of the transfer DMA section and the current reception DMA address of the reception DMA section whenever the transfer DMA section attempts to start data transfer in the transfer data size unit. If the underrun error is detected, the control section notifies the host of occurrence of the underrun error.

Thus, the presence or absence of an underrun error is detected at an appropriate timing not too frequent and the host can be notified of the underrun error if the error occurs.

Preferably, when detecting an underrun error, the printer once stores information concerning the underrun error in the memory and sends the information to the host upon reception of a request from the host. Just before the host attempts to start transmitting data in each reception data size unit, for example, each band, it sends a request to the printer for getting the error information.

The host of the invention typically is a computer and a computer program for use with the host (computer), for example, a printer driver program can be installed in or loaded into the computer through various media such as disk-type storage, semiconductor memory, and a communication network.

Features and advantages of the invention will be evident from the following detailed description of the preferred embodiments described in conjunction with the attached drawings.

DETAILED DESCRIPTION OF THE PREFERRED EMBODIMENTS

Figure 1:
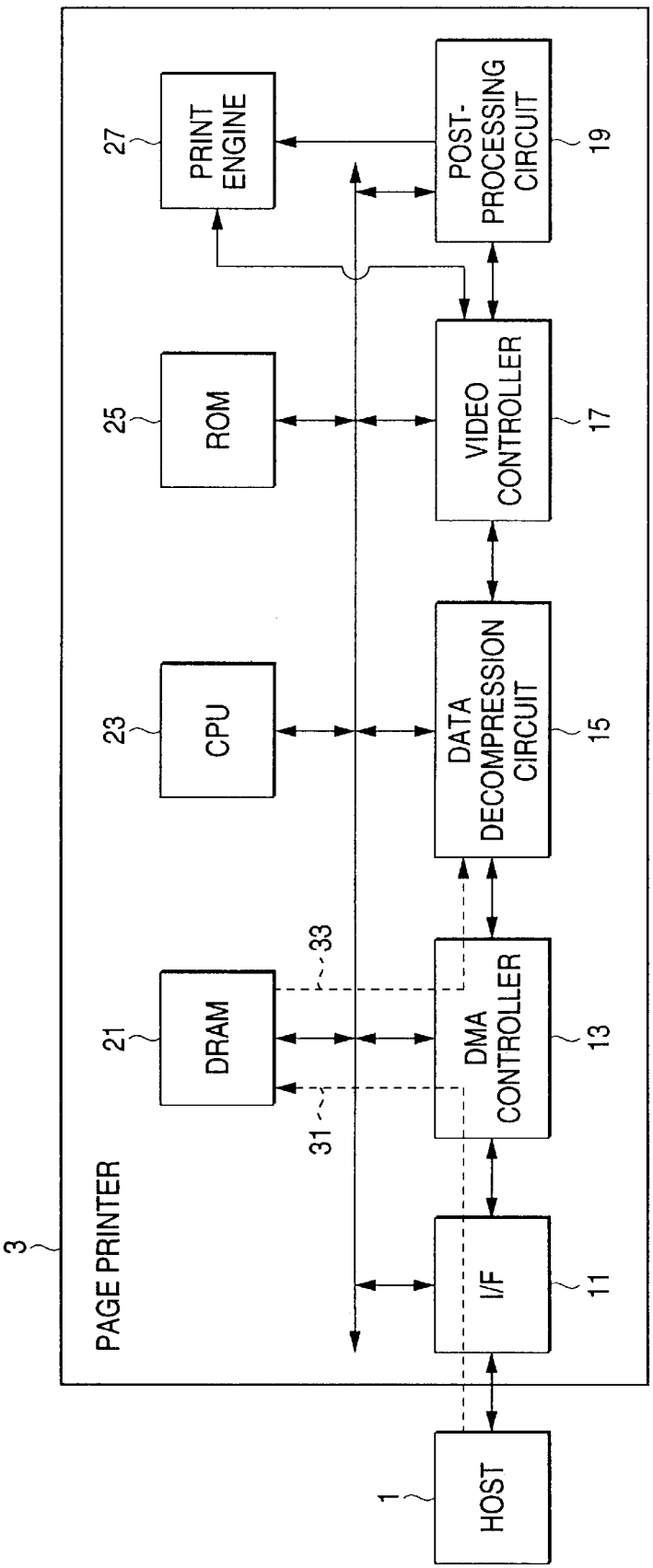
FIG. 1 is a block diagram to show the configuration of a first embodiment of the invention.

FIG. 1 shows the configuration of a first embodiment of the invention.

A page printer 3 of the embodiment is a host-based printer for receiving image data expanded into a bit map in a host 1 from the host 1 and printing the data. The printer 3 is connected to the host 1 via a dedicated interface such as a parallel interface or a network such as a LAN (local area network) so that the printer 3 can communicate with the host 1 bidirectionally. That is, the printer 3 can receive image data expanded into a bit map from the host 1 and can transmit various types of status of the printer, such as available buffer capacity, error information, and print success information, to the host 1. A reception buffer for storing the image data received from the host 1 is provided with a fixed or variable capacity in DRAM (dynamic random access memory) 21 in the printer 3. The reception buffer has a capacity smaller than the size of one page of image data. A work area of a CPU (central processing unit) 23 described later is also provided in the DRAM 21 and status information to be sent to the host 1 is stored in the work area.

The printer 3 has a print engine 27 of a mechanism for executing an electrophotographic process and a series of processing circuits for receiving image data from the host 1, applies necessary processing to the received image, and passes the resultant data to the print engine 27, namely, an interface circuit 11, a DMA (dynamic memory access) controller 13, a data decompression circuit 15, a video controller 17, and a postprocessing circuit 19. The processing circuits 11, 13, 15, 17, and 19 are formed of dedicated hardware logic circuitry. Further, the printer 3 has a microcomputer consisting of the above-mentioned CPU 23, ROM (read-only memory) 25 storing a program and fixed data, the above-described DRAM, etc., for interpreting a request received from the host 1, detecting an error, and managing the printer status. The functions of the components are as follows:

The interface circuit 11 performs control of bidirectional communication with the host 1, such as receiving a request and image data from the host 1 and transmitting status information to the host 1. The request received at the interface circuit 11 is read directly by the CPU 23. The CPU 23 interprets the request and executes control based on the request. The DMA controller 13 executes DMA for writing and reading image data into and from the reception buffer in the DRAM 21. The input and output paths of image data to and from the DRAM 21 by DMA are two channels of reception DMA 31 and transfer DMA 33. The image data from the host 1 is written into the DRAM 21 through the reception DMA 31. The image data is transferred from the DRAM 21 to the data decompression circuit 15 through the transfer DMA 33.

If the image data from the host 1 is compressed, the data decompression circuit 15 decompresses the compressed image data to the original data and then passes the data to the video controller 17 at the following stage. If the image data from the host 1 is not compressed, the data decompression circuit 15 passes the data to the video controller 17 as it is. The video controller 17 controls the timing of image data transfer to the print engine 27, called video transfer.

The postprocessing circuit 19 applies postprocessing of resolution conversion for matching the resolution of image data with that of the print engine 27, edge smoothing for smoothing edges of characters, etc., gradation control for adjusting a gradation value considering a gamma characteristic, etc., and the like to the image data and sends the resultant data to the print engine 27. For example, when the print engine 27 has a resolution of 600 dpi, if the data received from the host is 300 dpi, the resolution conversion function is to convert the resolution 300 dpi into the same resolution of the print engine 27, 600 dpi. As described later, for example, if the host 1 first sends image data with 600 dpi and an underrun error occurs and the print results in a failure, then the resolution conversion function makes it possible to drop the resolution of the image data from the host 1 to 300 dpi and retry printing.

The CPU 23 sends printer information (fixed state information to some extent in one print job, such as communication mode and RAM size) to the host 1 upon reception of a request from the host 1 at the print starting time, gets the current status of the printer (state information varying from time to time, such as engine state, available buffer capacity, error occurring, and print success or failure for each page) in real time and records the status in the work area in the DRAM 21 during the printing, and sends the status to the host in response to a request from the host 1. As a function particularly related directly to the invention among the functions, the CPU 23 calculates an available capacity of the reception buffer in the DRAM 21 based on the write address of the DMA controller 13 into the DRAM 21 (reception DMA address) and the read address (transfer DMA address) and records the available capacity in the work area in the DRAM 21, then sends the available reception buffer capacity to the host 1 in response to a request from the host 1.

Figure 2:
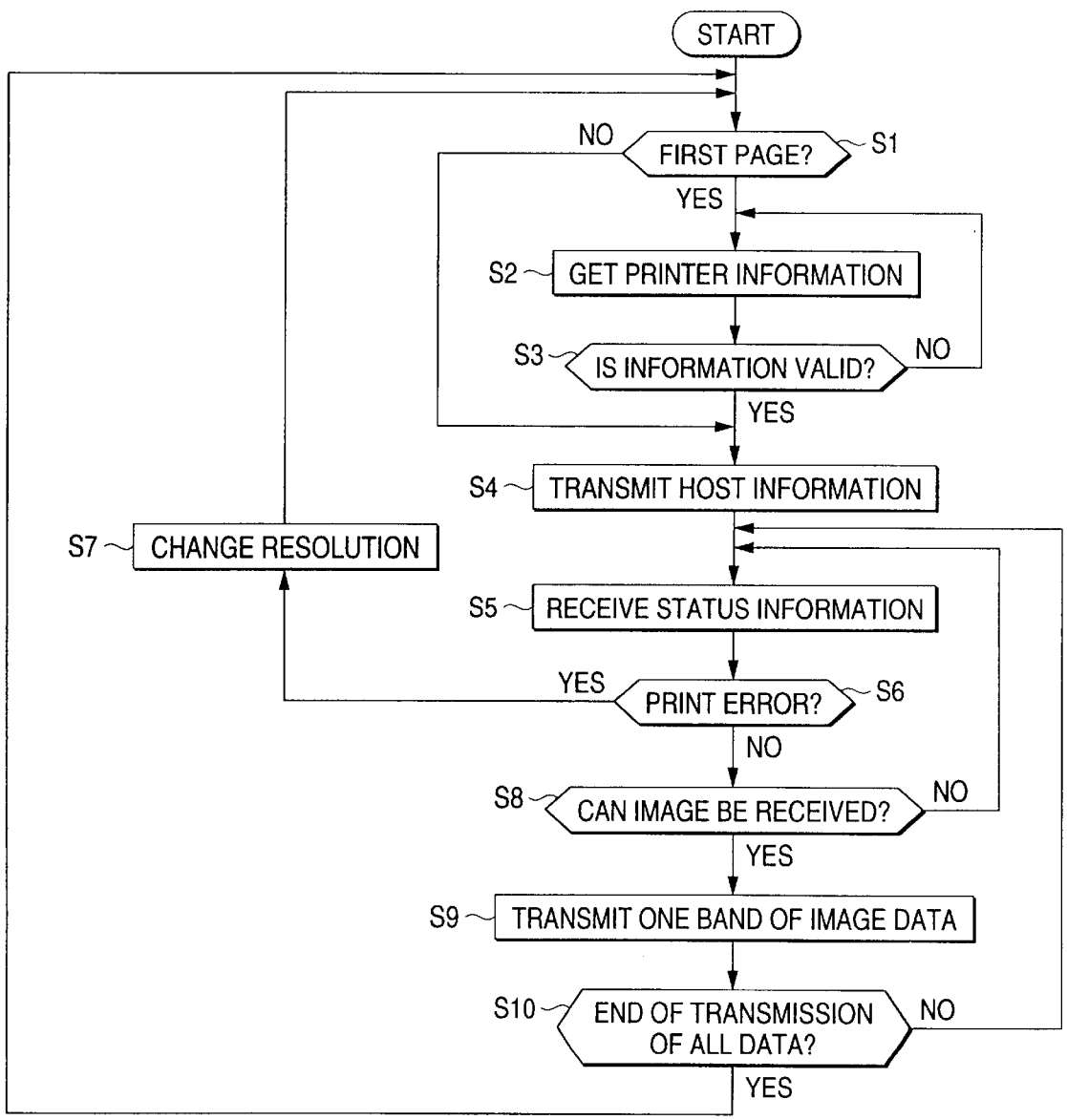
FIG. 2 is a flowchart of control performed by a host 1 for each page when the host 1 sends image data to a printer 3.

Next, the operation in the described configuration is as follows:

FIG. 2 shows a flow of control performed by the host 1 for each page when the host 1 sends image data to the printer 3.

First, the host 1 determines whether the page to be printed is the first page or the second or later page at step 1. If the page is the first page, the host 1 gets printer information, such as communication mode (communication mode established between the printer 3 and the host 1, for example, Compatibility or ECP if parallel communication is executed) and DRAM size (if the printer information is not ready, information indicating "preparation") at step S2, and grasps the limitations on the printer 3 based on the gotten information. For the second or later page, printer information is not gotten. In addition to the first page, the host 1 also gets printer information after a print error occurs at step S6, and checks whether or not the printer 3 is recovered from the error.

Upon reception of printer information from the printer 3, the host 1 determines whether the printer information is valid or invalid, namely, is valid printer information indicating the communication mode, the DRAM size, etc., or invalid printer information indicating preparation at step S3. If the printer information is preparation (invalid), the host 1 reads printer information repeatedly until reception of valid printer information. The possible reason why the printer information becomes preparation (invalid) is that the printer 3 is being initialized or is being recovered from an error.

When the host 1 gets valid printer information, it determines the image data transmission mode of resolution, etc., based on the communication mode and DRAM size of the printer 3. Next, the host 1 transmits host information concerning the image data to be printed, such as image data resolution and the total number of bands, to the printer 3 at step S4. Upon reception of the host information, the printer 3 performs register setting and page setting of buffer clear, etc., based on the host information.

Next, the host 1 receives printer status, such as engine state, available buffer capacity, error occurring, and print success or failure for each page, from the printer 3 at step S5 and checks whether or not the printer 3 can receive one band of image data based on the received printer status at steps S6 and S8. That is, the host 1 determines that the printer 3 can receive one band of image data if the following conditions (1) to (4) are satisfied:

(1) The print engine 27 can perform the print operation. That is, the print engine 27 can receive data, a print-impossible state, such as no paper, paper jam, cover open, or engine error, is not entered, and the fuser temperature is a specified temperature.

(2) Page setting of printer 3 is complete.

(3) The reception buffer has an available capacity of one band or more.

(4) No error occurs.

The printer 3 sets a print success/failure flag each time print of one page is complete. The host 1 sees the print success/failure flag contained in the printer status gotten from the printer 3 at step S6. If the flag indicates "success," the host 1 deletes the page of the image data from the host 1; if the flag indicates "failure," the host 1 returns to step S1 and retransmits the image data starting at the failing page. To retransmit the image data, if the print failure is caused by an underrun error, the host 1 converts the image data resolution into a lower value (for example, from 600 dpi to 300 dpi) at step S7 and retransmits the image data. Since the data size is lessened by dropping the resolution, an underrun error becomes hard to occur when the image data is retransmitted as described later in detail.

The host 1 transmits one band of image data at step S9 only if it determines that the printer 3 can receive one band of image data at step S8, whereby an overrun error is avoided. Before transmitting band image data, the host 1 determines whether or not the band data is reduced in size if the band data is compressed. If the band data is reduced in size, the host compresses the data; if the band data is not reduced in size, the host does not compress the data. Before transmitting band image data, the host 1 informs the printer 3 whether or not the band data is compressed data (compression ON/OFF) and of the compressed band data size (compression ON) or the original band data size (compression OFF). The printer 3 stores the band image data in the reception buffer in the DRAM 21 and starts video transfer upon completion of storing a predetermined number of bands of data.

Next, the host 1 checks whether or not all one page of band data has been transmitted at step S10. If not all one page has yet transmitted, the host 1 returns to step S5. Thus, the host 1 transmits image data to the printer 3 in band units and checks the printer status each time before transmission to see if the printer 3 can receive one band of data.

Therefore, when the printer 3 has an available buffer capacity of at least one band, it receives data of one-band size at the most (one band in compression ON; less than one band in compression OFF), whereby an overrun error is avoided as described above.

Figure 3:
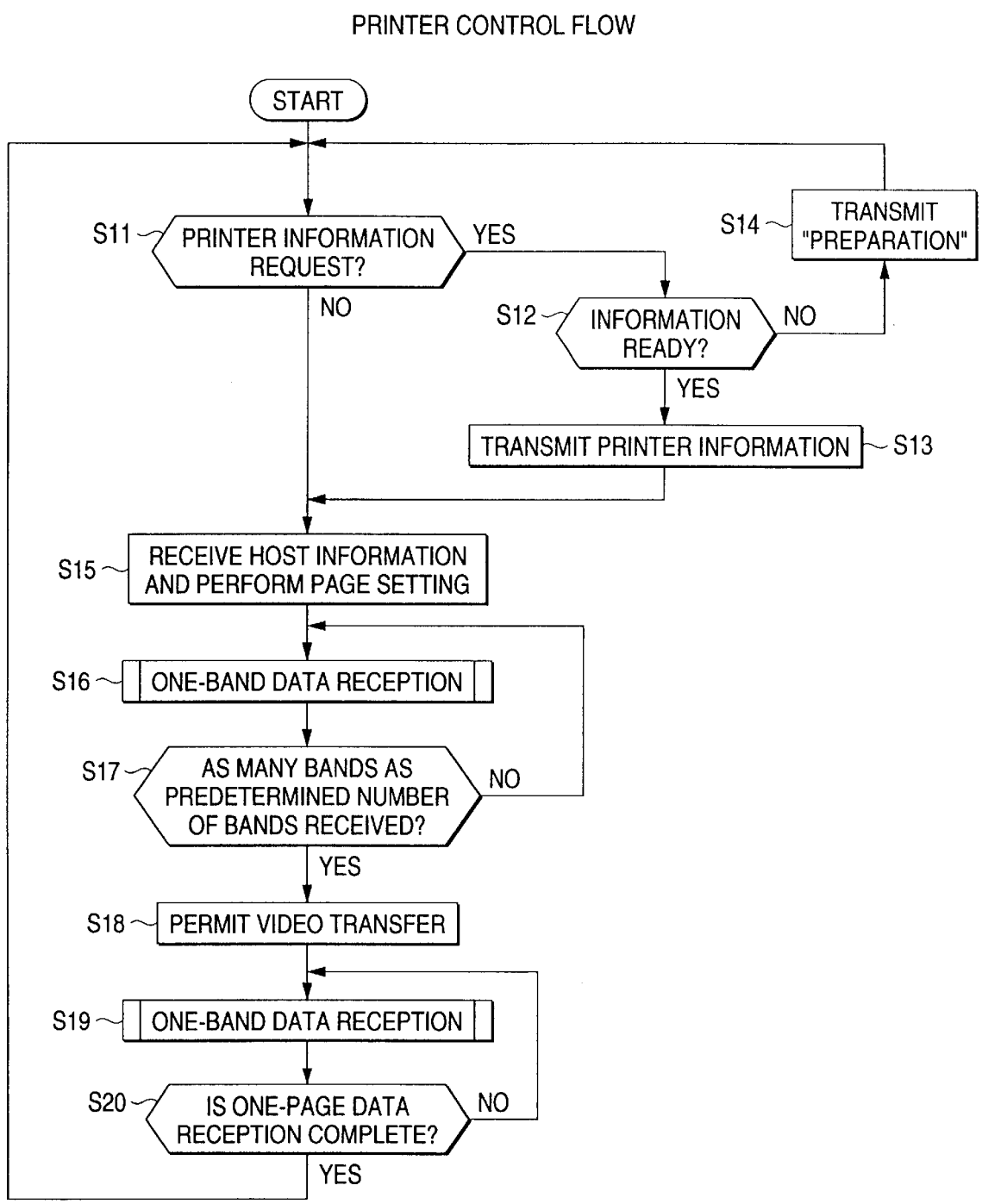
FIG. 3 is a flowchart of control of a printer CPU 23 when the printer 3 receives data from the host 1.

FIG. 3 shows an operation flow of the printer 3 when the printer 3 receives data from the host 1.

First, if the host 1 makes a request to send printer information (YES at step S1), the CPU 23 of the printer 3 transmits printer information of the communication mode, DRAM size, etc., to the host 1 at step S13. If the printer information is not ready (NO at step S12), the CPU 23 of the printer 3 informs the host 1 that the printer is in preparation (specifically, the printer is being initialized or is being recovered from an error) at step S14.

After transmitting the printer information to the host 1, the CPU 23 of the printer 3 receives host information concerning image data (resolution 300 or 600 dpi and the total number of bands) from the host 1 and performs register setting concerning data reception and page setting of buffer clear, etc., based on the received host information at step S15.

Figure 4:
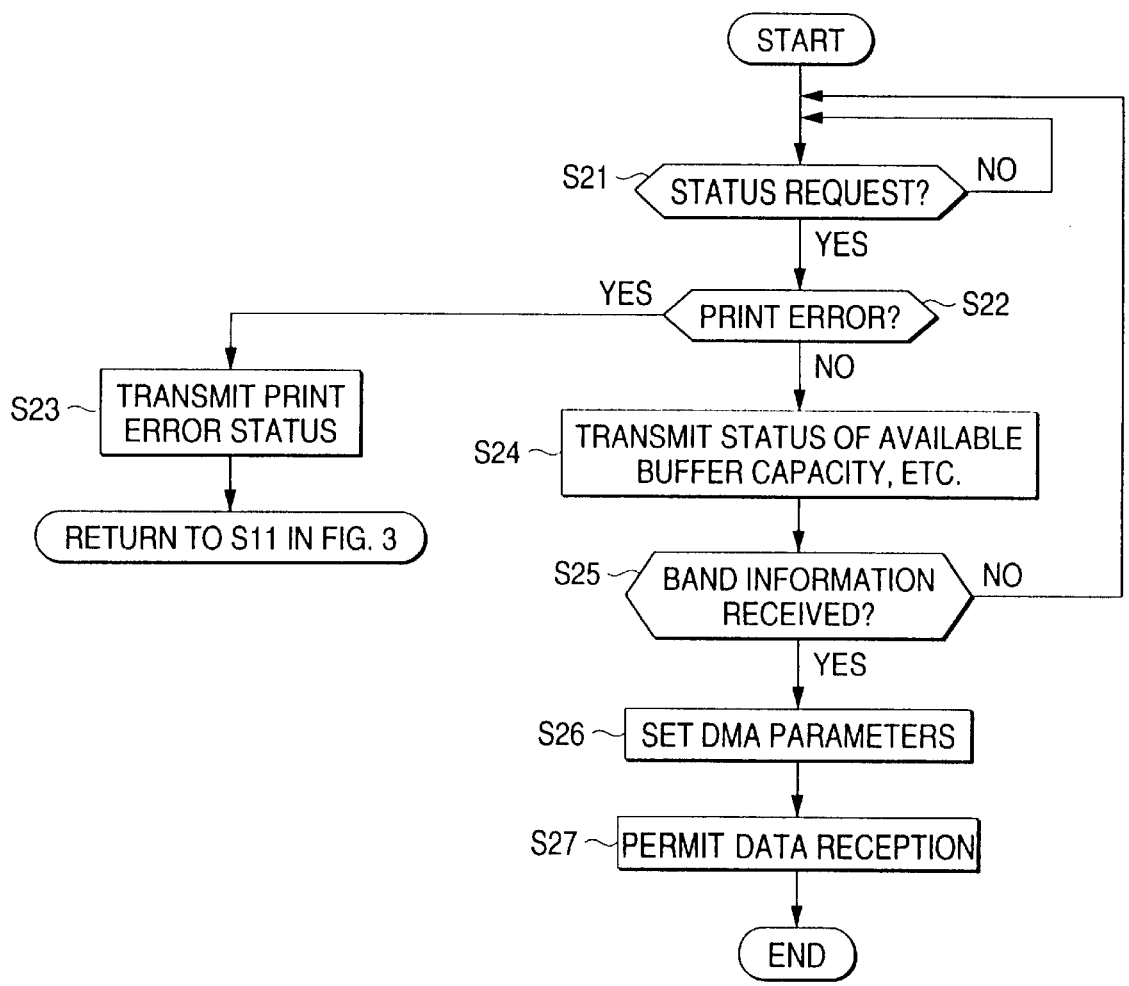
FIG. 4 is a flowchart of control of one-band data reception.

Subsequently, a process to receive one band of image data from the host 1 is entered at step S16. FIG. 4 shows a control flow of the one-band data reception.

As shown in FIG. 4, when a printer status request comes from the host 1 (YES at step S21), the CPU 23 sends the current printer status to the host 1 at steps S22, S23, and S24. Specifically, if a print error occurs at present, the CPU 23 sends the error status of the print error type, etc., to the host 1 at step S23 and returns to step S11 in FIG. 3. If no error occurs, the CPU 23 sends status information, such as available buffer capacity, engine state, end of page setting, and page print success or failure, to the host 1 at step S24. The available buffer capacity is calculated from the transfer DAM address and the reception DMA address of the DMA controller 13 as described above. The host 1 determines whether or not the printer 3 can receive one band of data based on the status information and if the host 1 determines that the printer 1 can receive one band of data, it sends band information of compression ON/OFF, band compression size, etc., followed by the band of image data to the printer, as described above.

The CPU 23 of the printer 3 sets parameters concerning reception DMA of the DMA controller 13, such as the start point of the reception DMA address and the number of bytes of band data, based on the band information of compression ON/OFF, band compression size, etc., at step S26 and permits the DMA controller 13 to receive data at step S27. Then, the DMA controller 13 receives one band of image data on the path of the reception DMA 31 from the host 1 and writes the data into the reception buffer in the DRAM 21. If band information does not come from the host 1 (NO at step S25), control returns to step S21.

The DMA controller 13, which starts data reception, receives the image data as much as the number of bytes set at step S26, namely, one band of image data. Upon completion of receiving the data, the DMA controller 13 informs the CPU 23 of the fact, and control of the CPU 23 goes to step S17 shown in FIG. 3.

The CPU 23 checks whether or not image data as much as a predetermined number of bands is stored in the reception buffer in the DRAM 21 at step S17. If data as much as the predetermined number of bands is not stored, the CPU 23 again returns to step S16 and repeats reception of subsequent band data. If data as much as the predetermined number of bands is stored, the CPU 23 permits the DMA controller 13 to execute video transfer at step S18. Then, video transfer is started. That is, the DMA controller 13 starts the operation of reading image data from the DRAM 21 and transferring the read data to the data decompression circuit 15 and the data decompression circuit 15, the video controller 17, and the postprocessing circuit 19 also start their respective processing, then the print engine 27 starts printing. Still after the video transfer is started, data reception in band units from the host 1 is continued likewise at step S19 (details are as shown in FIG. 4). Upon completion of one page of data (YES at step S20), control returns to step S11 and data reception of the next page is started in a similar sequence.

The "predetermined number of bands" determined at step S17 is determined by the CPU 23 based on the following principle for the purpose of preventing an underrun error:

Let the data reception speed from the host 1 be x [bytes/sec], the video transfer speed be y [bytes/sec], data compression ratio be a, the total number of data pieces of one page be T [bytes], the reception buffer size be M [bytes], and the size of data stored in the reception buffer at the time at which video transfer is started be P [bytes]. Normally, the video transfer speed y is higher than the data reception speed x and if the transfer DMA address of the high-speed video transfer catches up with the reception DMA address of the low-speed data reception, an underrun error occurs. However, if P is set to as satisfy $$P \leq M \quad (1)$$

$$(\alpha XT-P)/x < T/y \quad (2)$$

reception of one page of data is complete before the transfer DMA address of the video transfer catches up with the reception DMA address of the data reception, thus an underrun error does not occur. From expressions (1) and (2), $$M \geq P > T(\alpha - x/y) \quad (3)$$

is derived. If P is set so as to satisfy this expression (3), an underrun error does not occur. In the embodiment, the predetermined number of bands rather than bytes is adopted, thus the minimum P [bytes] satisfying expression (3) is divided by the compression band size [bytes] and one is added to the quotient of the division, then the result may be set as the "predetermined number of bands."

At the instant at which data as much as the "predetermined number of bands" has been stored in the reception buffer, the video transfer is started, whereby an underrun error can be avoided. In addition, starting of the video transfer is delayed only necessary minimum, thus the print speed is also high.

If the "predetermined number of bands" is determined at the beginning of a page, there appears a possibility that an underrun error will occur if the compression rate α lowers or the data reception speed from the host 1 lowers. In this case, it is necessary to set the buffer size M larger or drop the image resolution to lessen the total data size of one page T. Particularly, the resolution conversion effect is large; for example, if the resolution is dropped from 600 dpi to 300 dpi, the data size becomes a quarter. Therefore, when data is retransmitted after an underrun error once occurs, execution of resolution conversion (at step S7 in FIG. 2) produces a large effect of preventing an underrun error from again occurring. Although the print image quality somewhat worsens by executing resolution conversion, it is more preferred for the user than the case where print is impossible.

Figure 5:
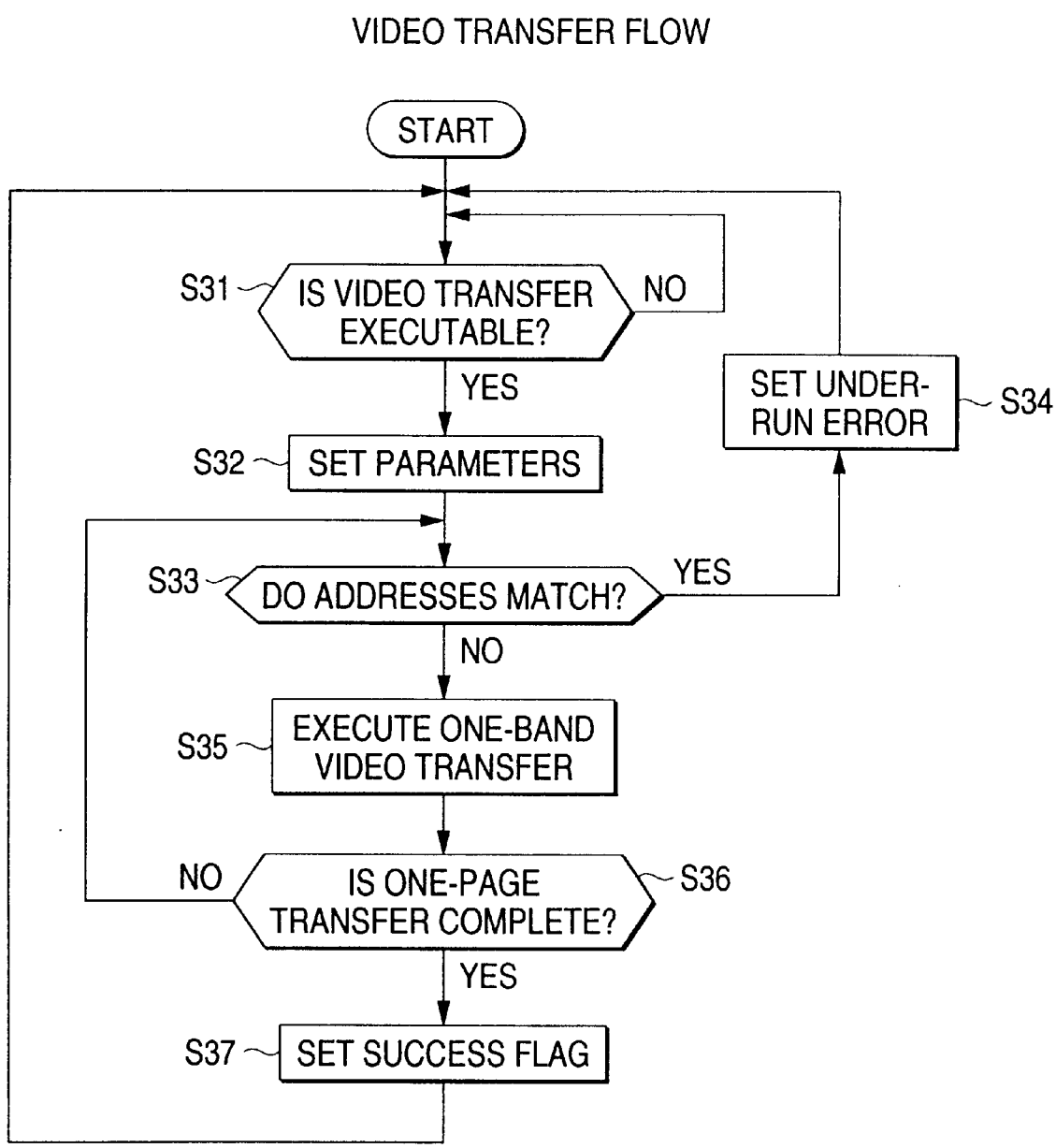
FIG. 5 is a flowchart of control of video transfer.

FIG. 5 shows a flow of control performed by the CPU 23 for video transfer (S18).

The CPU 23 checks whether or not video transfer is executable (namely, image data is already received as much as the predetermined number of bands or more) at step S31. If image data is already received, the CPU 23 performs register setting concerning video transfer based on the host information concerning the image data, such as resolution and the total number of bands, at step S32. Next, the CPU 23 sets parameters concerning transfer DMA of the DMA controller 13, such as the start point of the transfer DMA address and the number of bytes of band data, and parameters of the data decompression circuit 15, such as expansion ON, OFF, etc., based on the band information of the compression:band size, etc. When setting the start point of the transfer DMA address the CPU 23 compares the start point of the reception DMA address of the current DMA being executed (or to be started) with the start point of the transfer DMA address to be set at step S33. If both match, the CPU 23 determines that an underrun error occurs, and sets an underrun error flag in the work area in the DRAM 21 at step S34. The host 1 is informed of the underrun error by reading the printer status before transmission of each band as described above (step S5 in FIG. 2). At the instant at which the host 1 reads the printer status, the underrun error flag is reset. As described above, if the host 1 detects an underrun error, it drops the resolution of the error occurring image data and retransmits the data starting at the first band, then also transmits the subsequent bands of image data with the resolution dropped.

If an underrun error does not occur, the CPU 23 of the printer 3 permits the DMA controller 13 to execute one-band transfer DMA at step S35. Whenever one-band transfer DMA terminates, the DMA controller 13 informs the CPU 23 of the fact. Then, the CPU 23 returns to step S33. One-band transfer DMA setting and one-band transfer DMA execution are thus repeated until one-page transfer is complete. Upon completion of transferring one page (YES at step S36), the CPU 23 sets a print success flag in the work area in the DRAM 21 at step S37. When the host 1 reads the printer status, it is informed of the print success flag. At the instant at which the host 1 reads the printer status, the print success flag is reset. As described above, if the host 1 receives the print success flag, it deletes the page of the image data.

Upon completion of the one-page video transfer, control returns to step S31 and video transfer of the next page is started in a similar sequence. If the image data compression rate is high or the reception buffer size is sufficiently large, more than one page of image data is stored in the reception buffer 43 and is printed successively at the maximum throughput of the print engine 27.

Figure 6:
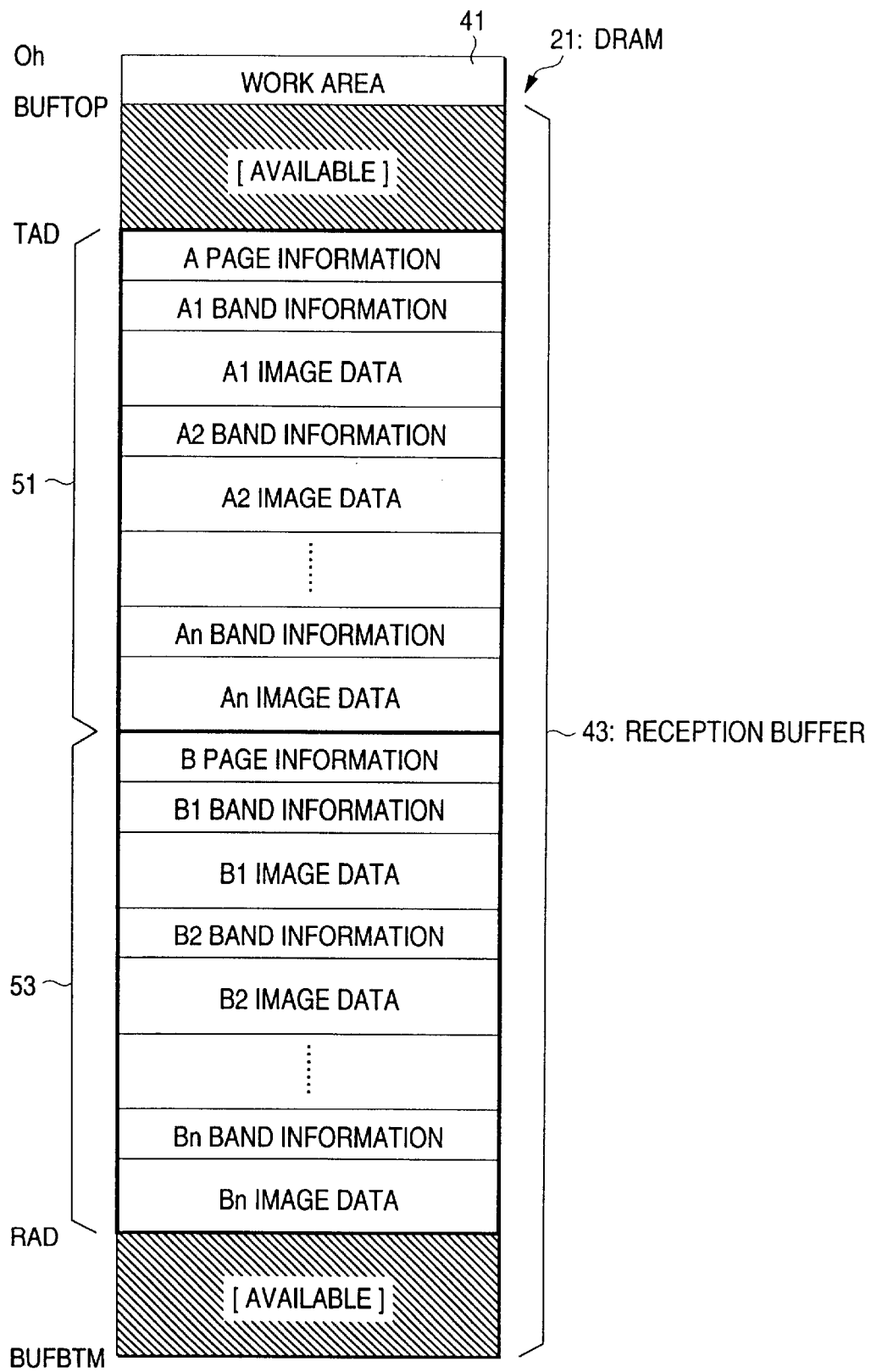
FIG. 6 is a memory map of DRAM 21.

FIG. 6 shows the structure of the DRAM 21.

As previously described, the work area 41 and the reception buffer 43 are provided in the DRAM 21. The work area 41 is used as heap memory and stack memory. In the example shown in the figure, of all area of the DRAM 21, the area of buffer top address BUFTOP to buffer end address BUFBTM provides the reception buffer 43. In reception DMA, address point (reception DMA address) RAD is advanced in the direction from the buffer top address BUFTOP to the buffer end address BUFBTM and when the address point RAD reaches the buffer end address BUFBTM, it returns to the buffer top address BUFTOP. Likewise, also in transfer DMA, address point (transfer DMA address) TAD is advanced in the direction from the buffer top address BUFTOP to the buffer end address BUFBTM and when the address point TAD reaches the buffer end address BUFBTM, it returns to the buffer top address BUFTOP. Thus, the reception buffer 43 is used as a ring buffer.

The example shown in the figure shows a state in which B page of data 53 is being stored in the reception buffer 43 and video transfer of A page of data 51 preceding the B page is about to start. Each page of data 51, 53 contains the host information concerning each page image, such as resolution and the total number of bands, information on each band, such as compression ON, OFF and compression band size, each band of image data, and the like.

Figure 7:
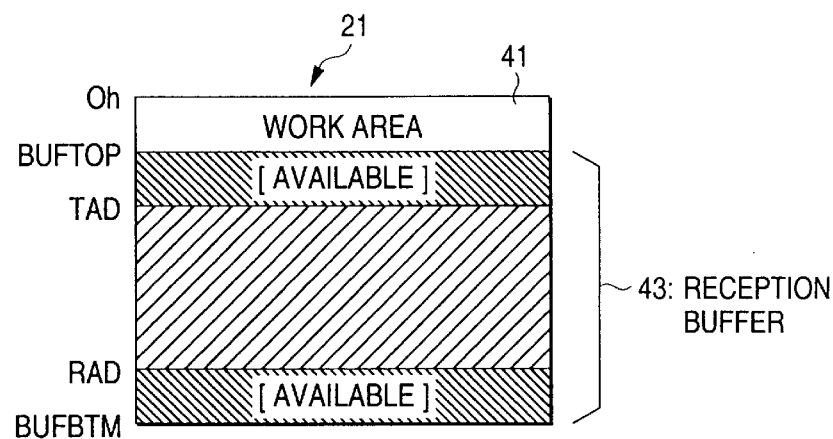
FIGS. 7A and 7B are drawings to show two states of a reception buffer 43.
Figure 7:
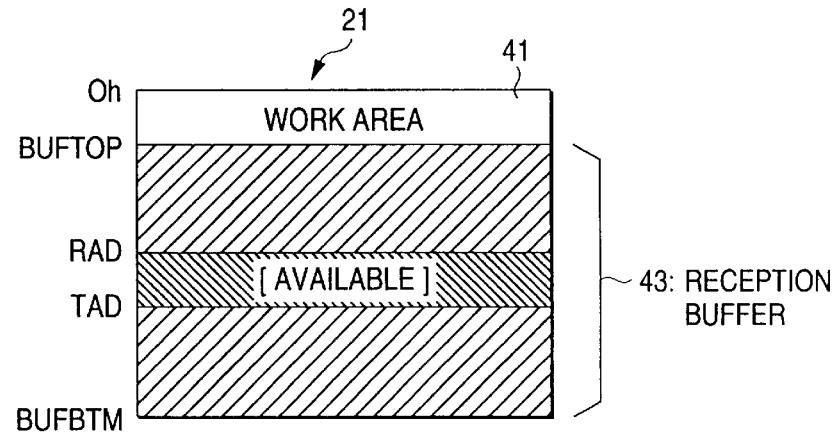

In the embodiment, as described above, to prevent an overrun error from occurring, the host 1 transmits data in band units and the printer 3 calculates the available capacity of the reception buffer 43 each time before transmission of the data and informs the host 1 of the available capacity. The host 1 executes transmission only if the available capacity is one band or more. A method of calculating the available capacity is as follows:

FIGS. 7A and 7B show two states of the reception buffer 43. That is, FIG. 7A shows the state of "reception DMA address RAD>transfer DMA address TAD and FIG. 7B shows the state of "reception DMA address RAD<transfer DMA address TAD." Reception data is stored in the hatched areas and the areas described as "available" is available areas.

Figure 8:
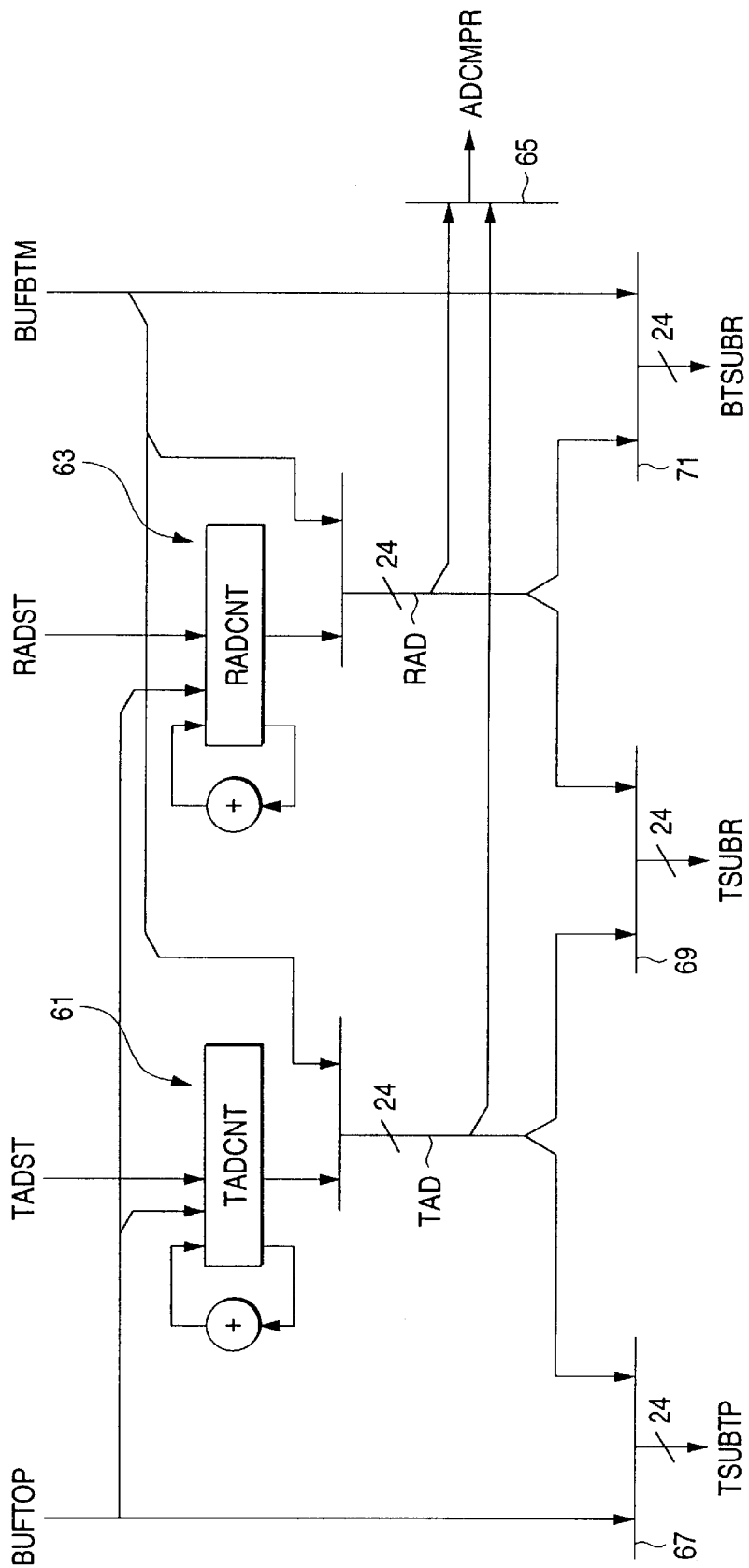
FIG. 8 is diagram to show the configuration of a circuit (or software) used for calculating an available buffer capacity.

When "reception DMA address RAD>transfer DMA address TAD" shown in FIG. 7A, available capacity=$(TAD-BUFTOP)+(BUFBTM-RAD)$ and when "reception DMA address RAD<transfer DMA address TAD" shown in FIG. 7B, available capacity=$TAD-RAD$ FIG. 8 shows a circuit (or a software processing flow) used for calculating the available capacity.

In FIG. 8, TADST denotes the start point of the transfer DMA address and RADST denotes the start point of the reception DMA address; as previously described, TADST and RADST are set by the CPU 23 when transfer DMA of each band and reception DMA of each band are started. TADCNT denotes a counter indicating the address of the reception buffer to execute transfer DMA and RADCNT denotes a counter indicating the address of the reception buffer to execute reception DMA.

While transfer DMA of each band is executed, a transfer DMA address counter 61 uses the transfer DMA start address TADST as the initial value of the output value and advances the output value one by one so as to circulate from the reception buffer top address BUFTOP to the reception buffer end address BUFBTM like a ring. The output value of the transfer DMA address counter 61 is the transfer DMA address TAD.

Likewise, while reception DMA of each band is executed, a reception DMA address counter 63 uses the reception DMA start address RADST as the initial value of the output value and advances the output value one by one so as to circulate from the reception buffer top address BUFTOP to the reception buffer end address BUFBTM like a ring. The output value of the reception DMA address counter 63 is the reception DMA address RAD.

A comparator 65 compares the transfer DMA address TAD with the reception DMA address RAD and sets an address comparison flag ADCMPR indicating TAD or RAD, whichever is the greater. Subtractors 67, 69, and 71 calculate "TAD−BUFTOP=TSUBTP," "TAD−RAD=TSUBR," and "BUFBTM−RAD=BTSUBR" respectively.

The CPU 23 sees the address comparison flag ADCMPR. When "reception DMA address RAD>transfer DMA address TAD," the CPU 23 sets available capacity=$TSUBTP+BTSUBR$ When "reception DMA address RAD<transfer DMA address TAD," the CPU 23 sets available capacity=$TSUBR$ Next, a second embodiment of the invention will be discussed.

The general configuration of the embodiment is similar to that shown in FIG. 1. In the second embodiment, a host 1 determines the video transfer start timing and sends the determined start timing to a printer 3. Generally, the host 1 has a high CPU processing capability as compared with the printer 3, thus if the host 1 determines the start timing, the start timing can be set more accurately than that if the printer 3 determines the start timing. When the available capacity of a reception buffer is reduced to a predetermined amount (for example, one band) before the specified start timing comes from the host 1, the printer 3 starts video transfer spontaneously at the point in time, thereby avoiding a situation in which the reception buffer becomes full and the printer 3 is stalled before the specified start timing comes from the host 1. If the video transfer is started earlier than the specified start timing from the host 1, actually printing can be executed in some cases, thus error occurrence can be minimized. When the video transfer start timing specified by the host 1 is timing earlier than reception completion of one page of data, if an underrun error occurs, the host 1 first changes the start timing to the timing following reception completion of one page of data and sends the new timing to the printer 3, then resends the data. If an underrun error again occurs, then the host 1 resends the data with the resolution dropped (for example, from 600 dpi to 300 dpi) to the printer 3. The reception buffer of the printer 3 need not have a capability of storing one page of the original high-resolution data, but has a capacity capable of storing one page of the data with the resolution dropped.

Figure 9:
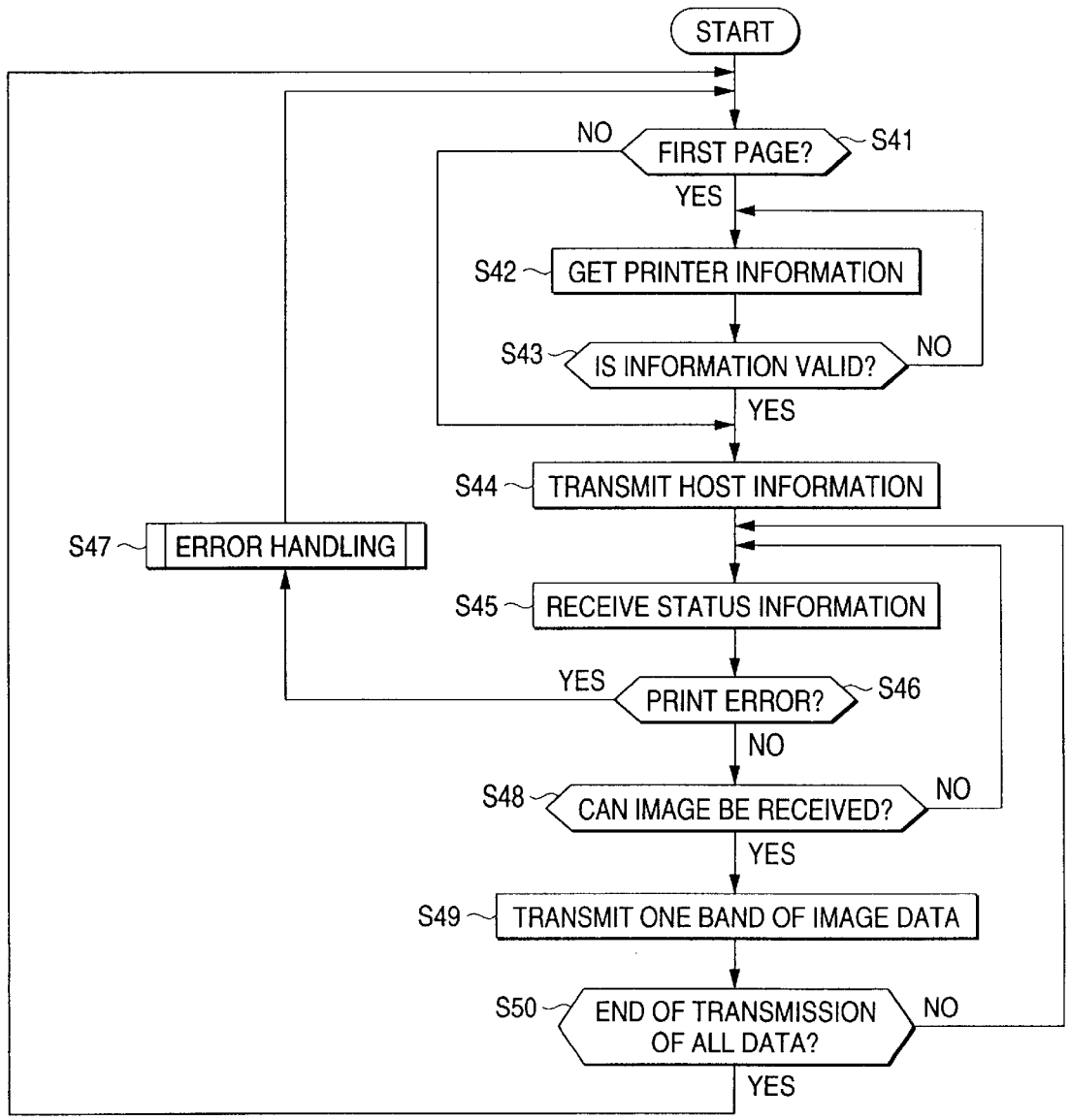
FIG. 9 is a flowchart of control performed by a host 1 for each page when the host 1 sends image data to a printer 3 in a second embodiment of the invention.

FIG. 9 is a flowchart of control performed by the host 1 for each page when the host 1 sends image data to the printer 3 in the second embodiment.

Here, only differences from the control flow of the host in the first embodiment previously described with reference to FIG. 2 will be discussed; parts not described are the same as those in the flow in FIG. 2.

The host 1 transmits host information (namely, information concerning image data) to the printer 3 at step S43. The host information contains the video transfer start timing (what'th band) in addition to the resolution of the image data (300 or 600 dpi) and the total number of bands of the image data. The host 1 determines the start timing so as to satisfy expression (3) previously described in the first embodiment, namely, the condition $$M \geq P > T(\alpha - x/y) \tag{3}$$

where x is the data reception speed from the host 1 [bytes/sec], y is the video transfer speed [bytes/sec], α is data compression ratio, T is the total number of data bytes of one page [bytes], M is the reception buffer size [bytes], and P is the size of data stored in the reception buffer at the time at which video transfer is started [bytes]. The data reception speed x varies with the type of image data transmission port (parallel, USB, Ethernet, etc.,) or the communication mode of the port (if parallel is applied, Compatibility, ECP, etc.,). Thus, when determining the start timing, the host 1 changes the start timing in response to the port type or the communication mode. For example, if the reception speed x is high as in parallel ECP, early start timing is set; if the reception speed x is not stable as in network communication, late start timing is set (for example, so as to start video transfer after reception of all of one page of data). The printer 3 previously sends the communication mode established between the host 1 and the printer 3 as printer information to the host 1 as required at step S42 (for example, if the printer 3 does not inform the host 1 of parallel communication mode (Compatibility or ECP), the host 1 is not informed, thus the printer 3 informs the host 1 of the parallel communication mode).

The printer 3 performs register setting and page setting of buffer clear, etc., based on the host information sent from the host 1 at step S44. At the time, the start timing contained in the host information is also stored in a register in the printer 3. After this, the printer 3 stores each page of data sent from the host 1, and starts video transfer as a rule if the start timing specified from the host 1 for each page is reached (namely, upon reception of the number of bands as the start timing specified from the host 1).

The printer 3 sets a print success/failure flag each time print of one page is complete. The host 1 sees the print success/failure flag contained in the printer status gotten from the printer 3 at step S46. If the flag indicates "success," the host 1 deletes the page of the image data from the host 1; if the flag indicates "failure," the host 1 goes to error handling at step S47 and retransmits the image data starting at the failing page.

Figure 10:
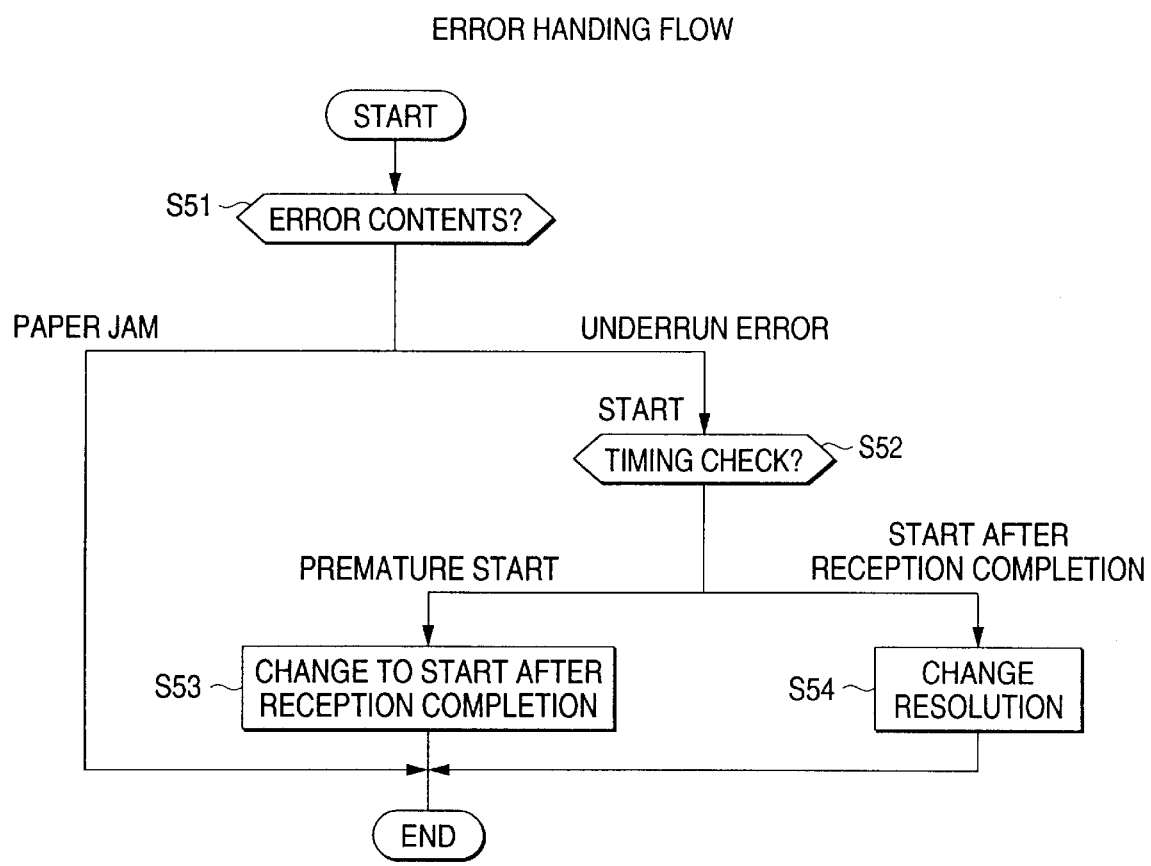
FIG. 10 is a flowchart of error handling of the host in the second embodiment of the invention.

FIG. 10 shows a flow of the error handling.

First, the error contents are checked at step S51. If the error cause is a paper jam, simply the data is retransmitted starting at the failing page. On the other hand, if the error cause is an underrun error, then the video transfer start timing specified for the printer 3 at the error occurrence time is checked at step S52. If a premature start (namely, start of video transfer before reception completion of all of one page of data) is specified, the start timing is changed to "start of video transfer after reception completion of all of one page of data" at step S53, the post-changed start timing is again specified for the printer 3 at step S44 in FIG. 9, and the data is retransmitted starting at the failing page at step S49 in FIG. 9. If the printer is already instructed to "start video transfer after reception completion of all of one page of data" at the error occurrence time, the resolution is dropped (for example, from 600 dpi to 500 dpi), the failing page of data is again prepared from the beginning at step S53, the printer 3 is informed of the dropped resolution at step S44 in FIG. 9, and as the failing page, the data with the resolution dropped is retransmitted at step S49 in FIG. 9. The data retransmission may be automatically executed by the host 1. Alternatively, the user may be informed of error occurrence and be requested to specify whether or not the data is to be resent and specify whether or not the resolution is to be dropped if the data is to be resent.

Figure 11:
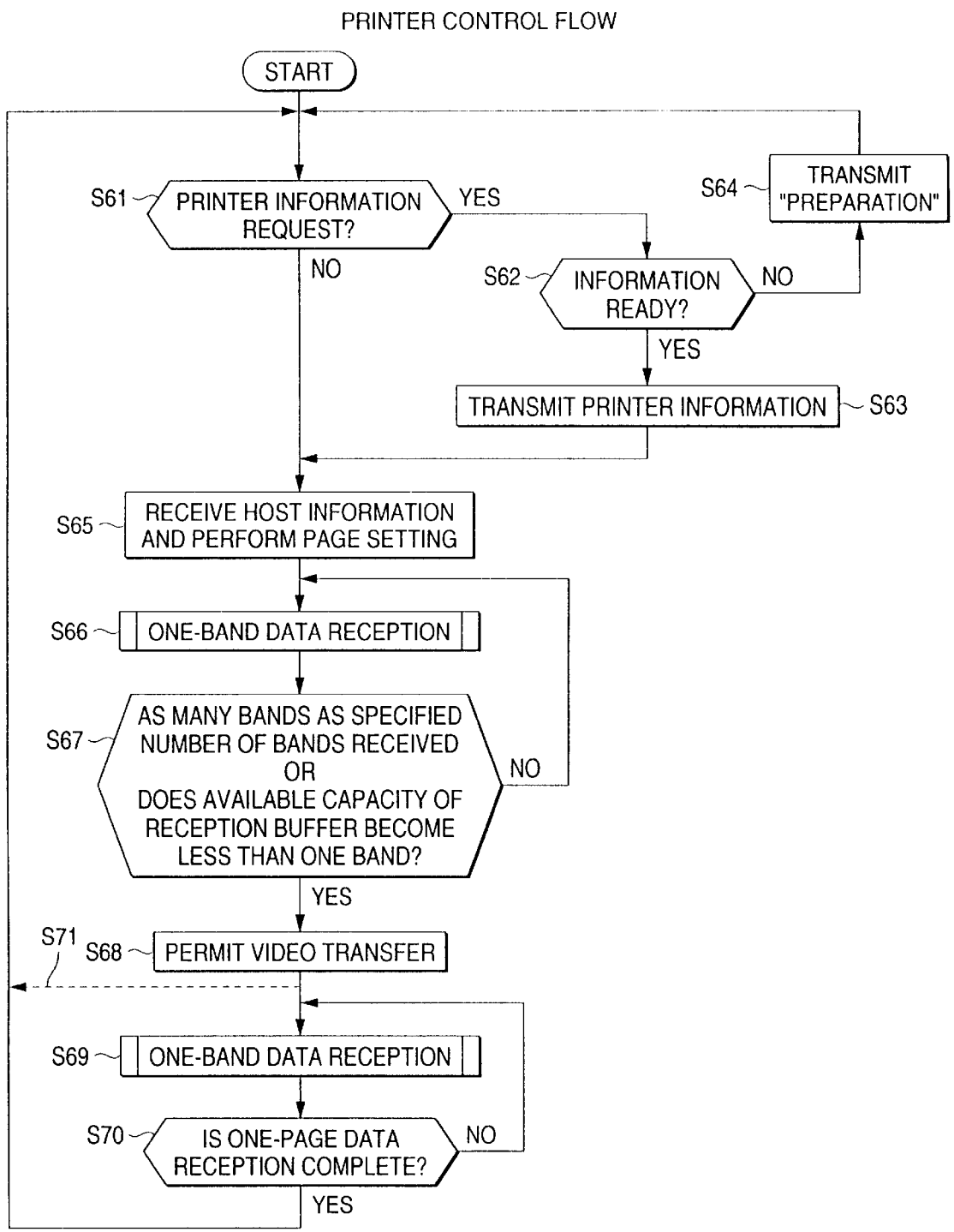
FIG. 11 is a flowchart of control of a printer CPU 23 when the printer 3 receives data from the host 1 in the second embodiment of the invention.

FIG. 11 shows an operation flow of the printer 3 when the printer 3 receives data from the host 1.

Here, only differences from the control flow of the printer in the first embodiment previously described with reference to FIG. 3 will be discussed; parts not described are the same as those in the flow in FIG. 3.

At step S65, the printer 3 receives host information (resolution, and the total number of bands, video transfer timing, etc.,) from the host 1 and performs register setting concerning data reception and page setting of buffer clear, etc., based on the received host information.

Subsequently, the printer 3 enters a process for receiving one band of image data from the host 1 on a flow as shown in FIG. 4 at step S66. While receiving data in the reception buffer from the host 1, the printer 3 checks whether or not as many bands as the number of bands as the start timing specified from the host 1 has been received and whether or not the available capacity of the reception buffer becomes less than one band at step S67. If reception of as many bands as the specified number of bands is complete, the printer 3 can start video transfer at step S68. If the number of bands specified from the host 1 is the total number of bands of one page, namely, the printer 3 is instructed to "start video transfer after reception completion of all of one page of data," the printer 3 returns to step S61 immediately after video transfer is started at step S71, and enters the data reception operation of the next page.

If there is a situation in which the data compression rate is poor unexpectedly or the original data is fairly larger than the reception buffer size, the available capacity of the reception buffer may becomes less than one band before as many bands as the number of bands specified from the host 1 is received. In this case, at the instant at which the available capacity of the reception buffer may becomes less than one band, the printer 3 starts video transfer. In this case, the probability that an underrun error may occur becomes high, but normal printing can be executed to no small extent because the start timing specified by the host 1 contains a sufficiently large margin, etc.

Figure 12:
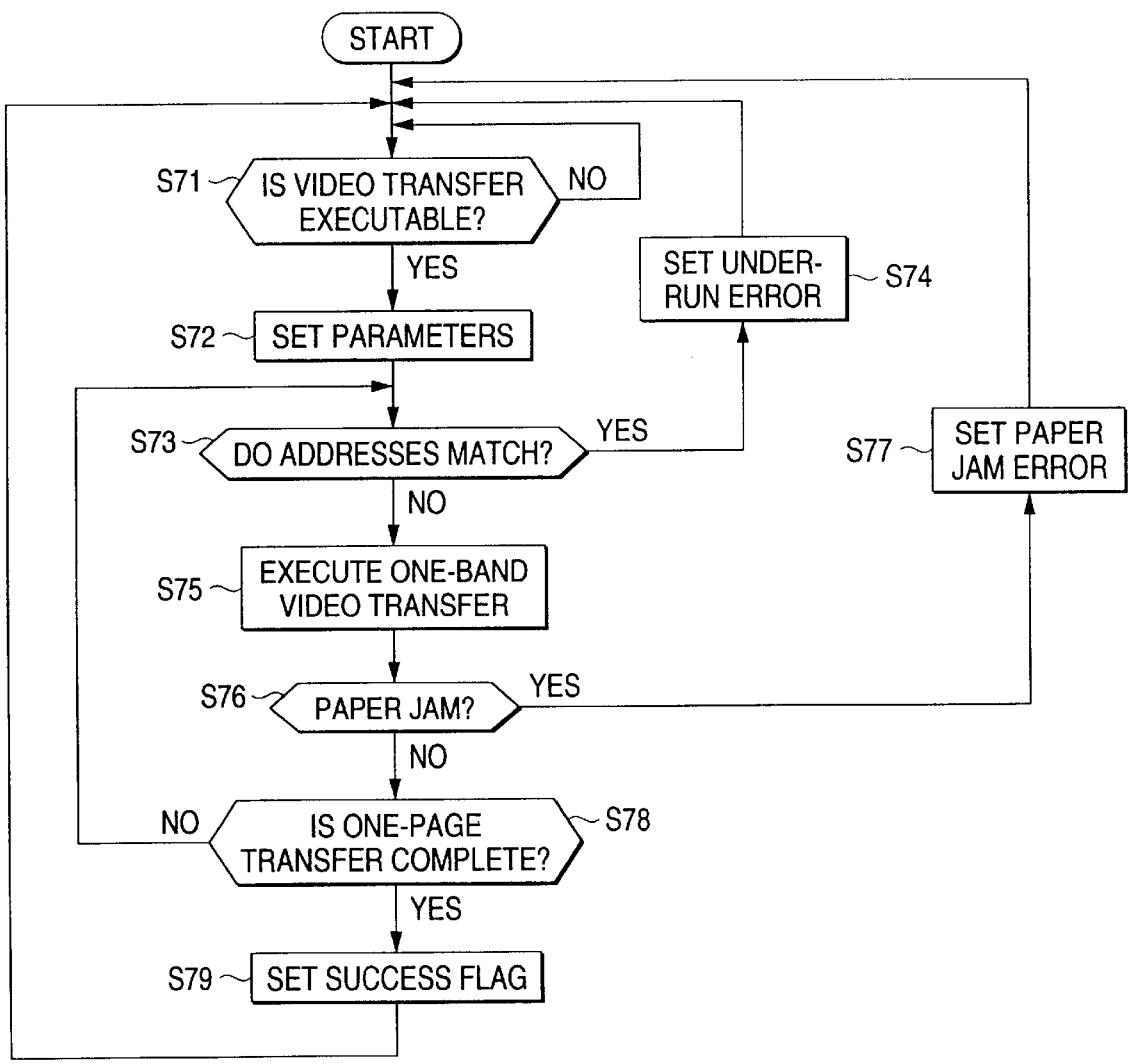
FIG. 12 is a flowchart of control of video transfer in the second embodiment of the invention.

FIG. 12 shows a flow of control of video transfer performed by the printer 3.

Here, only differences from the video transfer flow in the first embodiment previously described with reference to FIG. 5 will be discussed; parts not described are the same as those in the flow in FIG. 5.

First, whether or not video transfer is executable is checked based on whether or not as many bands as the number of bands specified from the host 1 or more bands have been received at step S71. If as many bands as the specified number of bands or more bands have been received, one-band video transfer is executed in a sequence similar to that in the flow in FIG. 5 at steps S72 to S75. The printer engine state is checked at step S76. If a paper jam occurs, a paper jam flag is set at step S77. If the host 1 detects a paper jam error, it resends the data without changing the parameter as shown in FIG. 10.

While the preferred embodiments of the invention have been described, such description is for illustrative purposes only, and it is to be understood that the invention is not limited to the embodiments thereof. Therefore, many apparently widely different embodiments of the invention may be made without departing from the spirit and scope thereof.

What is claimed is:

1. A page printer comprising:

a memory containing a buffer;

an image output section for forming an image based on data and outputting the image;

a reception section for writing the data received from a host into the buffer;

a transfer section for transferring the data in the buffer to said image output section; and a control section for controlling said reception section and said transfer section, wherein said control section permits said transfer section to transfer the data in the buffer after at least a part as much as a predetermined amount P of one page of the data from the host is stored in the buffer, and wherein the predetermined amount P is equal to or less than a buffer size, and is set before said transfer section is permitted to transfer the data so that a predicted point in time at which said transfer section will complete transferring of all of one page of the data from the buffer becomes later than a predicted point in time at which said reception section will complete writing of all of the page of the data into the buffer.

2. A page printer according to claim 1, wherein the predetermined amount P substantially satisfies:

$$M \geq P > T(\alpha - (x/y))$$

where x is a predicted data reception speed from the host, y is a predicted data transfer speed to said image output section, α is a predicted compression rate of the data from the host, T is a total number of data pieces of one page, and M is the buffer size.

3. A page printer according to any one of claims 1 and 2, wherein the predetermined amount P is set by one of said control section and the host.

4. A page printer according to claim 1, wherein if the buffer has an available capacity reduced to a predetermined minimum amount even before data as much as the predetermined amount P is stored in the buffer, said control section permits said transfer section to transfer the data in the buffer.

5. A page printer comprising:
a memory containing a buffer;
an image output section for forming an image based on data and outputting the image;
a reception section for writing data received from a host into the buffer;
a transfer section for transferring the data in the buffer to said image output section; and
a control section for controlling said reception section and said transfer section,
wherein said control section permits said transfer section to transfer the data in the buffer at a predetermined start timing and the start timing is set variably in response to a parameter affecting an increase or decrease in the data in the buffer.

6. A page printer according to claim 5, wherein the start timing is set variably in response to at least one of parameters of a predicted data reception speed from the host, a predicted data transfer speed to said image output section, a predicted compression rate of data from the host, a total number of data pieces of one page, and the buffer size.

7. A page printer according to claim 5, wherein the start timing is applied when at least a part as much as a predetermined amount P of one page of data from the host is stored in the buffer, and wherein the predetermined amount P is set so as to substantially satisfy:

$$M \geq P > T(\alpha - (x/y))$$

where x is a predicted data reception speed from the host, y is a predicted data transfer speed to said image output section, α is a predicted compression rate of data from the host, T is a total number of data pieces of one page, and M is the buffer size.

8. A page printer according to claim 5, wherein if the buffer has an available capacity reduced to a predetermined minimum amount even before the start timing comes, said control section permits said transfer section to transfer the data in the buffer.

9. A page printer according to any one of claims 5 to 8, wherein the start timing is set by one of said control section and the host.

10. A page printer comprising:
a memory containing a buffer;
an image output section for forming an image based on data and outputting the image;
a reception section for writing data received from a host into the buffer;
a transfer section for transferring the data in the buffer to said image output section;
an error detection section for detecting an underrun error caused by a fact that a read address of said transfer section from the buffer catches up with a write address of said reception section into the buffer; and
an error notification section for notifying the host of occurrence of the underrun error to cause the host to resend the data under a condition where the underrun error is harder to occur when the underrun error is detected.

11. A page printer according to claim 10, wherein when detecting the underrun error, said error detection section saves information indicating occurrence of the underrun error in said memory, and wherein, upon reception of a request from the host, said error notification section transmits the information in said memory to the host.

12. A page printer comprising:
memory containing a buffer;
an image output section for forming an image based on data and outputting the image;
a reception section for writing data received from a host into the buffer;
a transfer section for transferring the data in the buffer to said image output section; and
an available buffer capacity notification section for notifying the host of information concerning an available capacity of the buffer to cause the host to transmit data of a size that can be received at said printer.

13. A page printer according to claim 12, wherein, whenever the host attempts to start transmitting data in a predetermined unit, said available buffer capacity notification section notifies the host of information concerning the available capacity of the buffer before the host actually starts transmitting the data.

14. A page printer comprising:
a memory containing a buffer;
an image output section for forming an image based on data and outputting the image;
a reception DMA section for receiving data in a reception data size unit from a host and writing the data into the buffer by DMA;
a transfer DMA section for transferring the data in the buffer to said image output section in a transfer data size unit by DMA, the reception data size unit being the same as the transfer data size unit; and
a control section for controlling said reception DMA section and said transfer DMA section, said control section comprising:
an error detection section for checking whether or not an underrun error occurs based on a transfer DMA start address of said transfer DMA section and a current reception DMA address of said reception DMA section whenever said transfer DMA section attempts to start data transfer in the transfer data size unit; and
an error notification section for notifying the host of occurrence of the underrun error if the underrun error is detected.

15. A page print system comprising:

a host; and a page printer for printing data transmitted from said host in page units, said page printer comprising:
- a memory containing a buffer;
- an image output section for forming an image based on the data and outputting the image;
- a reception section for writing data received from said host into the buffer;
- a transfer section for transferring the data in the buffer to said image output section; and
- a control section for controlling said reception section and said transfer section, wherein said control section permits said transfer section to transfer the page of data after at least a part as much as a predetermined amount P, of one page of data from said host is stored in the buffer, and wherein the predetermined amount P is equal to or less than a buffer size and is set before said transfer section is permitted to transfer data so that a predicted point in time at which said transfer section will complete transferring of all of one page of data from the buffer becomes later than a predicted point in time at which said reception section will complete writing of all of the page of data into the buffer.

16. A page print system comprising:

a host; and a page printer for printing data transmitted from said host in page units, said page printer comprising:
- a memory containing a buffer;
- an image output section for forming an image based on the data and outputting the image;
- a reception section for writing data received from said host into the buffer;
- a transfer section for transferring the data in the buffer to said image output section; and
- a control section for controlling said reception section and said transfer section, wherein said control section permits said transfer section to transfer the data in the buffer at a predetermined start timing and the start timing is set variably in response to a parameter affecting an increase or decrease in the data in the buffer.

17. A page print system comprising:

a host; and a page printer for printing data transmitted from said host in page units, said page printer comprising:
- a memory containing a buffer;
- an image output section for forming an image based on the data and outputting the image;
- a reception section for writing data received from said host into the buffer;
- a transfer section for transferring the data in the buffer to said image output section;
- an error detection section for detecting an underrun error caused by a fact that a read address of said transfer section from the buffer catches up with a write address of said reception section into the buffer; and
- an error notification section for notifying said host of occurrence of the underrun error, wherein, when said host is notified of occurrence of the underrun error from said page printer, said host resends the data to said page printer under a condition where the underrun error is harder to occur.

18. A page print system comprising:

a host; and a page printer for printing data transmitted from said host in page units, said page printer comprising:
- a memory containing a buffer;
- an image output section for forming an image based on the data and outputting the image;
- a reception section for writing data received from said host into the buffer;
- a transfer section for transferring the data in the buffer to said image output section; and
- an available buffer capacity notification section for notifying said host of information concerning an available capacity of the buffer, wherein said host transmits data of a size that can be received at said page printer based on a notification from said page printer.

19. A page print system comprising:

a host; and a page printer for printing data transmitted from said host in page units, said page printer comprising:
- a memory containing a buffer;
- an image output section for forming an image based on the data and outputting the image;
- a reception DMA section for receiving data in a reception data size unit from said host and writing the data into the buffer by DMA;
- a transfer DMA section for transferring the data in the buffer to said image output section in a transfer data size unit by DMA, the reception data size unit being the same as the transfer data size unit; and
- a control section for controlling said reception DMA section and said transfer DMA section, said control section comprising:
  - an error detection section checks whether or not an underrun error occurs based on a transfer DMA start address of said transfer DMA section and a current reception DMA address of said reception DMA section whenever said transfer DMA section attempts to start data transfer in the transfer data size unit; and
  - an error notification section for notifying said host of occurrence of the underrun error if the underrun error is detected.

20. A page printer host for transmitting data in page units to a page printer adapted to temporarily store received data in a buffer and then transfer the data from the buffer to an image output section, said host comprising:

start timing specification means for determining a start timing at which transfer of each page of data in the buffer is to be started variably in response to a parameter affecting an increase or decrease in the data in the buffer and specifying the determined start timing for the page printer.

21. A computer-readable recording medium holding a program for causing a computer to function as a host for transmitting data in page units to a page printer adapted to temporarily store received data in a buffer and then transfer the data from the buffer to an image output section, wherein the host comprises start timing specification means for determining a start timing at which transfer of each page of data in the buffer is to be started variably in response to a parameter affecting an increase or decrease in the data in the buffer and specifying the determined start timing for the page printer.

22. A page printer host for transmitting data in page units to a page printer adapted to temporarily store received data in a buffer and then transfer the data from the buffer to an image output section for outputting an image, said host comprising:

data resending means for dropping a resolution of an image to lessen a total size of the data and resending the data having a less size to the page printer upon reception of a notification from the page printer indicating detection of an underrun error, wherein said underrun error is caused when a read address of data transfer from the buffer catches up with a write address of data storage into the buffer of the page printer.

23. A computer-readable recording medium holding a program for causing a computer to function as a host for transmitting data in page units to a page printer adapted to temporarily store received data in a buffer and then transfer the data from the buffer to an image output section, wherein the host comprises data resending means for resending the data to the page printer under a condition where an underrun error is harder to occur upon reception of notification indicating detection of an underrun error caused by a fact that a read address of data transfer from the buffer catches up with a write address of data storage into the buffer from the page printer.

* * * * *

UNITED STATES PATENT AND TRADEMARK OFFICE
CERTIFICATE OF CORRECTION

PATENT NO. : 6,665,088 B1
DATED : December 16, 2003
INVENTOR(S) : Noriyoshi Chiba et al.

It is certified that error appears in the above-identified patent and that said Letters Patent is hereby corrected as shown below:

<u>Title page,</u>
Item [30], Foreign Application Priority Data, please delete "May 5, 1999 (JP)" and insert -- April 5, 1999 (JP) --

Signed and Sealed this

Thirteenth Day of July, 2004

JON W. DUDAS
*Acting Director of the United States Patent and Trademark Office*